US008355757B2

(12) United States Patent  (10) Patent No.: US 8,355,757 B2
Rofougaran et al.  (45) Date of Patent: Jan. 15, 2013

(54) SYSTEM AND METHOD PROVIDING LOW POWER OPERATION IN A MULTIMODE COMMUNICATION DEVICE

(75) Inventors: Ahmadreza Rofougaran, Newport Coast, CA (US); Arya Behzad, Poway, CA (US); Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 466 days.

(21) Appl. No.: 11/298,355

(22) Filed: Dec. 7, 2005

(65) Prior Publication Data

US 2007/0082715 A1  Apr. 12, 2007

Related U.S. Application Data

(60) Provisional application No. 60/724,015, filed on Oct. 6, 2005.

(51) Int. Cl.
 *H04B 1/38* (2006.01)
(52) U.S. Cl. ............ 455/574; 455/456.4; 455/132; 455/513; 455/552.1; 455/553.1; 370/328; 370/334
(58) Field of Classification Search ............... 455/452.2, 455/552.1, 553.1, 115.3, 127.5, 114, 574
See application file for complete search history.

(56) References Cited

U.S. PATENT DOCUMENTS

| | | | |
|---|---|---|---|
| 5,615,215 A | 3/1997 | Utting et al. | |
| 5,870,673 A * | 2/1999 | Haartsen | 455/426.1 |
| 6,018,647 A | 1/2000 | Fitzgerald | |
| 6,192,230 B1 | 2/2001 | van Bokhorst et al. | |
| 6,236,674 B1 | 5/2001 | Morelli et al. | |
| 6,243,581 B1 * | 6/2001 | Jawanda | 455/432.2 |
| 6,297,768 B1 | 10/2001 | Allen, Jr. | |
| 6,678,508 B1 | 1/2004 | Koilpillai et al. | |
| 6,990,362 B2 | 1/2006 | Simpson et al. | |
| 7,042,858 B1 * | 5/2006 | Ma et al. | 370/331 |

(Continued)

FOREIGN PATENT DOCUMENTS

CN 1234167 11/1999

(Continued)

OTHER PUBLICATIONS

EPO Communication dated May 2, 2011 in Application No. 06014296.5-1249 / 1772996 (7 pages total).

*Primary Examiner* — Dai A Phuong
(74) *Attorney, Agent, or Firm* — Farjami & Farjami LLP

(57) ABSTRACT

A system and method providing low-power operation in a multimode communication device. Various aspects of the present invention may, for example, include at least one radio module that is adapted to communicate in a plurality of communication modes. The at least one radio module may also be adapted to operate in at least a first power-save mode. At least one module may, for example, be adapted to analyze at least one non-informational aspect of a signal (e.g., a received radio signal) to determine whether a first communication network corresponding to a first communication mode of the plurality of communication modes might be available. The at least one module may then, for example, be adapted to determine, based at least in part on the determined availability of the first communication network, whether to operate the at least one radio module in a respective mode other than the first power-save mode.

14 Claims, 6 Drawing Sheets

U.S. PATENT DOCUMENTS

| | | |
|---|---|---|
| 7,190,679 B2 | 3/2007 | Khawand et al. |
| 7,228,107 B2 | 6/2007 | Kim |
| 7,330,653 B1 | 2/2008 | Roberts et al. |
| 7,430,257 B1 | 9/2008 | Shattil |
| 2002/0025778 A1* | 2/2002 | Lee .............................. 455/3.05 |
| 2003/0092451 A1* | 5/2003 | Holloway et al. ............. 455/461 |
| 2003/0214916 A1 | 11/2003 | Khawand et al. |
| 2003/0219035 A1* | 11/2003 | Schmidt ........................ 370/478 |
| 2004/0097260 A1 | 5/2004 | Stenton et al. |
| 2004/0110508 A1 | 6/2004 | Haartsen |
| 2004/0152419 A1* | 8/2004 | Lee .............................. 455/67.7 |
| 2005/0130713 A1 | 6/2005 | Simpson et al. |
| 2005/0159179 A1* | 7/2005 | Sainton et al. ............. 455/552.1 |
| 2005/0186906 A1 | 8/2005 | Hussmann |
| 2005/0215280 A1 | 9/2005 | Twitchell, Jr. |
| 2005/0226185 A1* | 10/2005 | Tell et al. ..................... 370/331 |
| 2006/0063560 A1* | 3/2006 | Herle ......................... 455/552.1 |
| 2006/0270463 A1 | 11/2006 | Copperman |
| 2006/0286984 A1* | 12/2006 | Bonner ......................... 455/445 |
| 2007/0026866 A1* | 2/2007 | Krishnamurthi et al. ..... 455/440 |
| 2007/0191069 A1 | 8/2007 | Matsumoto |
| 2008/0159373 A1 | 7/2008 | Taha et al. |
| 2008/0246656 A1 | 10/2008 | Ghazarian |

FOREIGN PATENT DOCUMENTS

| | | |
|---|---|---|
| CN | 1281319 | 1/2001 |
| CN | 1367623 | 9/2002 |
| JP | 2003318765 | 11/2003 |
| JP | 2003339083 | 11/2003 |
| WO | WO 2004/042941 | 5/2004 |
| WO | WO 2004/100399 | 11/2004 |
| WO | WO2005089007 | 9/2005 |

* cited by examiner

SYSTEM AND METHOD PROVIDING LOW POWER OPERATION IN A MULTIMODE COMMUNICATION DEVICE

CROSS-REFERENCE TO RELATED APPLICATIONS/INCORPORATION BY REFERENCE

This patent application is related to and claims priority from provisional patent application Ser. No. 60/724,015 filed Oct. 6, 2005, and titled "SYSTEM AND METHOD PROVIDING LOW POWER OPERATION IN A MULTIMODE COMMUNICATION DEVICE," the contents of which are hereby incorporated herein by reference in their entirety. This patent application is also related to U.S. patent application Ser. No. 11/297,881 filed Dec. 7, 2005, and titled "MOBILE COMMUNICATION DEVICE WITH LOW POWER SIGNAL DETECTOR," which is hereby incorporated herein in its entirety by reference. This patent application is additionally related to U.S. patent application Ser. No. 11/299,230 filed Dec. 7, 2005, and titled "MOBILE COMMUNICATION DEVICE WITH LOW POWER RECEIVER FOR SIGNAL DETECTION," which is hereby incorporated herein in its entirety by reference.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

A variety of electrical devices (e.g., portable electronic devices) have the capability to operate in at least one power-save mode. Such operation may be generally advantageous in that it helps provide for efficient use of electrical energy. In particular, portable electronic devices and other electronic devices with relatively limited power supplies (e.g., batteries) benefit from such efficient energy utilization, which prolongs the ability to operate without changing batteries or recharging.

A variety of power-saving techniques currently exist. For example, an electrical device may power down one or more peripheral devices (e.g., a display) when no activity with the electrical device is detected for a period of time. Another power-saving technique may, for example, comprise operating an electrical device in a sleep mode (e.g., placing any of a number of electrical devices in a sleep state) for a period of time. Such a power-saving technique may, for example, comprise waking various components of the electrical device occasionally to determine whether the electrical device should resume full-power operation.

In one non-limiting example, a mobile communication device may periodically wake-up radio circuitry and operate such radio circuitry at full power to search for and receive signals, which may then be decoded to determine information communicated by the signals. Such information may then, for example, be analyzed to determine whether the mobile communication device should resume full-time full-power operation to perform various types of communication (e.g., to receive a message, service an incoming call, etc.). Such decoding and information analysis generally requires, and sometimes unnecessarily requires, the utilization of finite energy resources.

As a number of radios or radio complexity in a multimode communication device increases, inefficient utilization of energy by radio and/or signal processing circuitry becomes even more significant. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method providing low-power operation in a multimode communication device, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
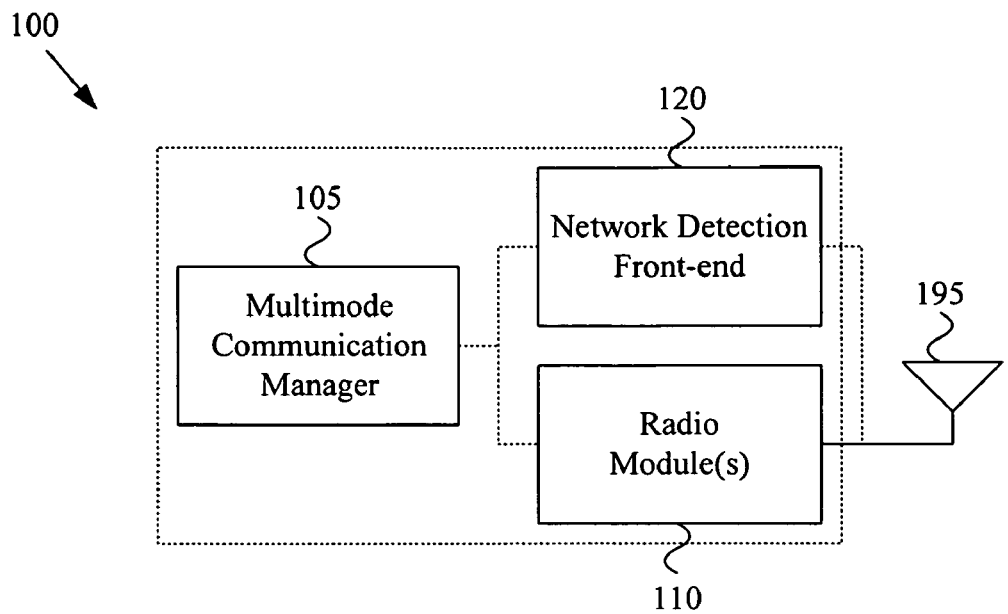
FIG. 1 is a diagram illustrating a portion of an exemplary multimode communication system, in accordance with various aspects of the present invention.

FIG. 1 is a diagram illustrating a portion of an exemplary multimode communication system 100, in accordance with various aspects of the present invention. The exemplary system 100 (and other exemplary systems discussed herein) may be utilized in any of a variety of multimode communication systems or devices. For example and without limitation, the exemplary system 100 may be utilized in a mobile communication device (e.g., a cellular telephone, pager, portable email device, etc.) having multimode communication capability. Also for example, the exemplary system 100 (and other exemplary systems discussed herein) may be utilized in any of a variety of computing devices (e.g., laptop computers, notebook computers, handheld computers, etc.) that have been adapted to have multimode communication capability. In general, the exemplary system 100 (and other systems discussed herein) may be utilized in any of a variety of electronic systems or devices that have multimode communication capability. Accordingly, the scope of various aspects of the present invention should not be limited by characteristics of any particular type of electronic device having multimode communication capability.

Various portions of the following discussion will, at times, refer to multimode communication and various communication modes. For the sake of the following discussion, a communication mode generally corresponds to communication utilizing a particular communication protocol. Such a protocol may, for example, comprise information communication rules corresponding to any of a number of various communication layers or levels (e.g., PHY layer, data link layer, MAC layer, transport layer, network layer, application layer, session layer, etc.).

Various communication modes may, for example and without limitation, correspond to computer, telephone and/or television communication modes. A computer network communication mode may, for example, comprise a Bluetooth mode, IEEE 802.11a mode, IEEE 802.11g mode, IEEE 802.15 mode, UltraWideBand mode, Wimax mode, etc. A cellular network communication mode may, for example, comprise a CDMA mode, WCDMA mode, UMTS mode, GSM mode, GPRS mode, EDGE mode, TDMA mode, PDC mode, etc. A television communication mode may, for example, comprise a DVB-H mode, analog TV mode, etc. The scope of various aspects of the present invention should not be limited by characteristics of any particular communication mode or combination of communication modes.

The exemplary system 100 may comprise at least one radio module 110 that is adapted to communicate in a plurality of communication modes. As will be illustrated later, the at least one radio module 110 may comprise a single programmable radio module that is programmable to operate in any of a plurality of communication modes. Also for example, the at least one radio module 110 may comprise a plurality of radio modules, each of which is dedicated to a particular communication mode. Additionally for example, the at least one radio module 110 may comprise a combination of programmable and dedicated radio modules. The scope of various aspects of the present invention should not be limited by characteristics of a particular radio module or combination thereof.

The exemplary system 100 may comprise a multimode communication manager 105 that generally manages communication in multiple communication modes. For example and without limitation, the multimode communication manager 105 may manage the flow of information to and from the at least one radio module 110. Also for example, the multimode communication manager 105 may coordinate transmission activities for the at least one radio module 110. Further, for example, the multimode communication manager 105 may manage the operational state of the at least one radio module 110. Still further for example, as will be discussed in more detail later, the multimode communication manager 105 may manage the programming and configuration of programmable radio modules.

Note that the multimode communication manager 105 is generally illustrative and should by no means be limiting. For example, various multimode communication device configurations may have independent communication management circuitry with no common communication manager. Accordingly, the scope of various aspects of the present invention should not be limited by characteristics of a multimode communication manager or by the existence or absence of such a multimode communication manager.

The exemplary system may comprise at least one module 120 that is adapted to determine whether one or more communication networks are available for communication. The at least one module 120 will be generally referred to herein as "the network detection front-end 120." Note, however, that this particular name should not limit the scope of various aspects of the present invention. For example and without limitation, as will be discussed later, the network detection front-end 120 may be adapted to perform functionality in addition to network detection.

The network detection front-end 120 may, for example, be adapted to analyze non-informational signal characteristics to determine whether one or more various communication networks might be available for communication with a communication device utilizing the exemplary system 100. The network detection front-end 120 may then, for example, be adapted to determine, based at least in part on the determined availability of various communication networks, whether to operate the at least one radio module 110 in a mode other than a particular power-save mode. Alternatively, as will be discussed below, the network detection front-end 120 may be adapted to analyze informational signal characteristics (e.g., by performing a low-power decode) to determine whether one or more various communication networks might be available.

The network detection front-end 120 may, for example, analyze non-informational signal characteristics of a signal that was received utilizing a portion of the at least one radio module 110. In other words, the network detection front-end 120 may receive the signal from the at least one radio module 110 (or a component thereof). In a non-limiting exemplary scenario, the network detection front-end 120 may utilize tuner and amplifier circuitry of the at least one radio module 110 to receive the signal through the antenna 195. The network detection front-end 120 may then receive the signal from the at least one radio module 110 (or a component thereof) for analysis.

Alternatively, for example, the network detection front-end 120 may comprise circuitry to receive and analyze the signal independently from the at least one radio module 110. For example and without limitation, the exemplary illustration in FIG. 1 shows, with a dashed line, that the network detection front-end 120 may be coupled to an antenna 195, such as may be generally utilized by the at least one radio module 110. Alternatively, for example, the network detection front-end 120 may comprise independent antenna structure. The network detection front front-end 120 may then, for example, comprise various circuitry to receive the signal to be analyzed (e.g., tuners, amplifier, mixers, filters, etc.).

In general, a signal analyzed by the network detection front-end 120 may be received in any of a variety of manners. Accordingly, the scope of various aspects of the present invention should not be limited by characteristics of any particular manner of, or mechanism for, receiving a signal.

In a non-limiting exemplary scenario, the network detection front-end 120 may be adapted to analyze non-informational signal characteristics to determine whether a first communication network corresponding to a first communication mode might be available. The network detection front-end 130 may then, for example, be adapted to determine, based at least in part on the determined availability of the first communication network, whether to operate the at least one radio module 110 in a mode other than a particular power-save mode (e.g., in a different power-save mode or in a full-power mode).

Continuing the non-limiting exemplary scenario, the network detection front-end 120 may also be adapted to analyze non-informational signal characteristics to determine whether a second communication network corresponding to a second communication mode might be available. The network detection front-end 120 may then, for example, be adapted to determine, based at least in part on the determined availability of the first communication network, whether to operate the at least one radio module 110 in a mode other than a particular power-save mode (e.g., in a different power-save mode or in a full-power mode). Note that the signal analyzed may be the same signal as analyzed to determine whether the first communication network might be available, or the signal analyzed may be a different signal.

As mentioned previously, the network detection front-end 120 may be adapted to determine whether a first (or second or nth) communication network corresponding to a first (or second or nth) communication mode might be available by, at least in part, analyzing at least one non-informational signal characteristic.

Communication signals generally carry information that is being communicated. Such signals may generally be considered to comprise informational characteristics and non-informational characteristics. For example, informational characteristics may generally be considered to be those characteristics of a signal that correspond to particular information being communicated with the signal. Such information may, for example, comprise characteristics of source/destination information, data information, protocol support information, etc. Information characteristics may, for example and without limitation, comprise the actual information, particular modulation characteristics related to particular information (e.g., a particular phase shift, frequency shift, amplitude shift, orthogonal code presence, any combination or sequence thereof, etc.).

On the other hand, non-informational characteristics, for example, may generally be considered to be those characteristics of a signal that are generally independent of particular information being communicated. For example, various non-informational characteristics may comprise a particular transmission frequency or frequency range, general signal strength, S/N ratio, general spectral content, particular temporal characteristics, modulation type, various envelope characteristics, etc.

In a non-limiting exemplary scenario, the network detection front-end 120 may be adapted to determine whether a first (or other) communication network corresponding to the first (or other) communication mode might be available by, at least in part, analyzing signal presence at a particular frequency. For example and without limitation, the first communication mode may generally include the presence of a signal at a particular frequency. Non-limiting examples may, for example, comprise beacon signals at particular frequencies, dedicated control/access channels, general data communication at a particular frequency, etc.

Further for example, the network detection front-end 120 may be adapted to determine whether a first (or other) communication network corresponding to the first (or other) communication mode might be available by, at least in part, analyzing signal presence over a particular frequency range. For example and without limitation, the first communication mode may generally be associated with a particular frequency band that is allocated for the first communication mode. In such an exemplary scenario, the network detection front-end 120 may determine whether a first communication network corresponding to the first communication mode might be present by determining, at least in part, whether there is signal presence in the particular frequency band.

In another non-limiting exemplary scenario, the network detection front-end 120 may also be adapted to determine whether a first (or other) communication network corresponding to the first (or other) communication mode might be available by, at least in part, analyzing strength of a received signal. For example and without limitation, the network detection front-end 120 may comprise any of a variety of Received Signal Strength Indication ("RSSI") circuitry to determine such signal strength. For example, the network detection front-end 120 may be adapted to determine that a signal presence above a particular signal strength or S/N ratio threshold is necessary for effective communication. In such an exemplary scenario, the network detection front-end 120 may be adapted to determine that a signal presence or S/N ratio below the threshold effectively indicates that the corresponding communication network is not available.

In a further non-limiting exemplary scenario, the network detection front-end 120 may be adapted to determine whether a first (or other) communication network corresponding to the first (or other) communication mode might be available by, at least in part, analyzing spectral content of a received signal. For example and without limitation, a received signal corresponding to a particular communication mode may generally comprise particular spectral characteristics. For example, such characteristics may comprise spectral characteristics corresponding to spread spectrum communications, frequency division communications, QAM communications, time division communications, frequency hopping communications, wideband communications, narrowband communication, burst communications, etc. In such an exemplary scenario, the network detection front-end 120 may be adapted to determine that the presence of one or more particular spectral characteristics indicates that a network compatible with a particular communication mode might be available.

In yet another non-limiting exemplary scenario, the network detection front-end 120 may be adapted to determine whether a first (or other) communication network corresponding to the first (or other) communication mode might be available by, at least in part, analyzing temporal characteristics of a received signal. For example and without limitation, a received signal corresponding to a particular communication mode may generally comprise particular temporal characteristics. Such temporal characteristics may, for example, comprise beacon length or spacing, packet length or spacing, request and acknowledgement general spacing, data rate, etc. In such an exemplary scenario, the network detection front-end 120 may be adapted to determine that the presence of one or more particular temporal characteristics indicates that a network compatible with a particular communication mode might be available.

In another non-limiting exemplary scenario, the network detection front-end 120 may be adapted to determine whether a first (or other) communication network corresponding to the first (or other) communication mode might be available by, at least in part, analyzing modulation characteristics of a received signal. For example and without limitation, a received signal corresponding to a particular communication mode may generally comprise particular modulation characteristics. Such modulation characteristics may, for example, comprise modulation type (e.g., FM, AM, QAM, 16QAM, ASK, FSK, PSK, BPSK, QPSK, 8PSK or other phase modulation, etc.), packet length or spacing, request and acknowledgement general spacing, data rate, etc. In such an exemplary scenario, the network detection front-end 120 may be adapted to determine that the presence of one or more particular modulation characteristics indicates that a network compatible with a particular communication mode might be available.

In still another non-limiting exemplary scenario, the network detection front-end 120 may be adapted to determine whether a first (or other) communication network corresponding to the first (or other) communication mode might be available by, at least in part, analyzing sub-signals of a received signal. For example and without limitation, a received signal corresponding to a particular communication mode may comprise particular sub-signal characteristics. Such sub-signal characteristics may, for example, comprise a particular type of synchronization signal, etc. In such an exemplary scenario, the network detection front-end 120 may be adapted to determine that the presence of one or more particular sub-signal characteristics indicates that a network compatible with a particular communication mode might be available. For further non-limiting examples, refer to U.S. Patent Application No. 60/723,994, filed Oct. 6, 2005, titled "Mobile Communication Device with Low Power Signal Detector," which is hereby incorporated herein in its entirety by reference.

The previously discussed exemplary scenarios presented non-limiting examples of various non-informational signal characteristics. The examples are not exhaustive and should by no means limit the scope of various aspects of the present invention to characteristics of the various examples.

Though the previous non-limiting exemplary scenarios discussed the analysis of individual non-informational signal characteristics, it should be understood that any combination of various non-informational signal characteristics may be analyzed. For example and without limitation, the network detection front-end 120 may be adapted to determine whether a first (or other) communication network corresponding to the first (or other) communication mode might be available by, at least in part, analyzing modulation type of signals received in a particular frequency range. Also for example, the network detection front-end 120 may be adapted to analyze spectral content of signals received above a particular signal strength threshold. Accordingly, the scope of various aspects of the present invention should not be limited by characteristics of any one or any combination of non-informational signal characteristics.

As discussed previously, the network detection front-end 120 may, for example, be adapted to determine, based at least in part on the determined availability of the first (or other) communication network, whether to operate the at least one radio module 110 in a mode other than a particular power-save mode (e.g., in a different power-save mode or in a full-power mode). The network detection front-end 120 may be adapted to make such a determination in any of a variety of manners.

For example and without limitation, the network detection front-end 120 may be adapted to determine to operate the at least one radio module 110 in a mode other than a particular power-save mode whenever it is determined that one or more particular communication networks might be available. In another example, the network detection front-end 120 may be adapted to determine to operate the at least one radio module 110 in a second low-power mode where, for example, the at least one radio module 110 wakes periodically to listen for messages communicated in a particular communication mode.

In an additional example, the network detection front-end 120 may be adapted to determine to operate the at least one radio module 110 in a fully functional mode to determine whether a detected communication network corresponds to a particular communication mode. Also for example, the network detection front-end 120 may be adapted to determine to operate the at least one radio module 110 in a partially functional mode, for example, including performing relatively low-power signal decoding (e.g., to determine additional information about a detected communication network).

In yet another example, the network detection front-end 120 may be adapted to determine to operate the at least one radio module 110 in an operating mode other than a particular power-save mode based, at least in part, on communication quality expected in communicating with various communication networks that might be available. For example, the network detection front-end 120 may be adapted to determine to fully activate a radio module corresponding to a highest expected communication quality. Similarly, the network detection front-end 120 may be adapted to make such determination based, at least in part, on communication monetary cost, power demands, predetermined priority, a user preference profile, etc.

In a further example, the network detection front-end 120 may be adapted to determine to operate the at least one radio module 110 to sequentially alternate between communicating with various detected communication networks. In a still further example, the network detection front-end 120 may be adapted to determine to operate the at least one radio module 110 to primarily service the highest priority communication network of a plurality of detected communication networks.

In general, the network detection front-end 120 may be adapted to determine, based at least in part on the determined availability of the first (or other) communication network, whether to operate the at least one radio module 110 in a respective mode other than the first power-save mode. Accordingly, the scope of various aspects of the present invention should not be limited by characteristics of any particular manner of making such determination.

As discussed previously, in various non-limiting exemplary scenarios, the network detection front-end 120 may be adapted to analyze various informational signal characteristics. Such analysis may, for example, replace analysis of non-informational signal characteristics or augment analysis of non-informational signal characteristics. For example, in an exemplary scenario where it was determined (e.g., based on analysis of various non-informational signal characteristics) that a first communication network corresponding to a first communication mode might be available, the network detection front-end 120 may be adapted to at least partially decode the signal to determine network identity, whether the first communication network is available, has messages waiting for a particular communication device, is presently attempting to communicate with a particular communication device, etc.

For example and without limitation, U.S. Patent Application No. 60/724,319, filed Oct. 6, 2005, titled "Mobile Communication Device with Low Power Receiver for Signal Detection," which is hereby incorporated herein in its entirety by reference, presents various non-limiting examples of analyzing various informational signal characteristics. Such reference provides various non-limiting examples utilizing a relatively low-power receiver to receive and/or analyze various informational signal characteristics. For example, relative to a first normal receiver, a first relatively low-power receiver may utilize any of a different frequency synthesizer, A/D converter, filter, signal processing type or amount, processor speed, voltage and/or current levels, etc.

In a scenario involving partial decoding, the network detection front-end 120 may be adapted to perform such partial decoding in any of a variety of manners. For example, the network detection front-end 120 may be adapted to decode a signal utilizing relatively reduced decoding functionality (e.g., utilizing only a portion of decoding circuitry or using particular decoding circuitry at a reduced performance level to perform the decoding operation). The network detection front-end 120 may, for example, utilize less decoding capability than might be typically utilized to operate in the first communication mode. For example, the network detection front-end 120 may be adapted to utilize various components of the at least one radio module 110 to perform such decoding operation.

In a non-limiting exemplary scenario, the network detection front-end 120 may be adapted to perform such partial decoding without utilizing error detection/correction circuitry that might generally be used for full decoding. In another non-limiting exemplary scenario, the network detection front-end 120 may be adapted to perform such partial decoding without running various frequency synthesis circuitry (e.g., phase lock loop circuitry) or running such circuitry at a reduced level of performance.

For example, in another exemplary scenario where it was determined (e.g., based on analysis of various non-informational signal characteristics) that a first communication network corresponding to a first communication mode might be available, the network detection front-end 120 may be adapted to at least partially analyze informational characteristics of a signal to determine network identity, whether the first communication network is available, has messages waiting for a particular communication device, is presently attempting to communicate with a particular communication device, etc.

Also for example, the network detection front-end 120 may be adapted to sample a received signal and compare a sequence of samples to a particular expected (or reference) sequence of samples. Additionally for example, the network detection front-end 120 may be adapted to sample a received signal and process such samples (e.g., statistically) to determine whether the first communication network corresponding to the first communication mode might be available. For example, various signals corresponding to various communication networks, various information sources, various information destinations or various information types may be characterized by particular statistical traits.

In general, in various non-limiting exemplary scenarios, various informational signal characteristics may be analyzed to determine whether a first (or other) communication network corresponding to a first (or other) communication mode of the plurality of communication modes might be available. Accordingly, the scope of various aspects of the present invention should not be limited by any particular manner of analyzing such informational signal characteristics.

In the example illustrated in FIG. 1, the exemplary system 100 is illustrated with a single network detection front-end 120 for the at least one radio module 110. In such a non-limiting exemplary scenario, the single network detection front-end 120 may be adapted to determine whether various communication networks might be available in a sequential or concurrent manner. For example, the network detection front-end 120 may be adapted to determine the availability of the first communication network with first circuitry and determine the availability of the second communication network with second circuitry that may be operated concurrently with the first circuitry. In another example, the network detection front-end 120 may be adapted to determine the availability of the first communication network with the same circuitry that is utilized to determine the availability of the second communication network. In such an exemplary scenario, the network detection front-end 120 may be adapted to determine the availability of the first communication network and then determine the availability of the second communication network.

FIGS. 2-6 will illustrate a non-limiting set of various exemplary system configurations. Such exemplary systems do not represent an exhaustive set of configurations, and accordingly, the scope of various aspects of the present invention should not be limited by characteristics of any particular exemplary system. Various components of the exemplary systems illustrated in FIGS. 2-6 may, for example and without limitation, share various characteristics with similar components of the exemplary system 100 illustrated in FIG. 1 and discussed previously. Accordingly, the following discussion will general focus on differences between the exemplary systems.

Figure 2:
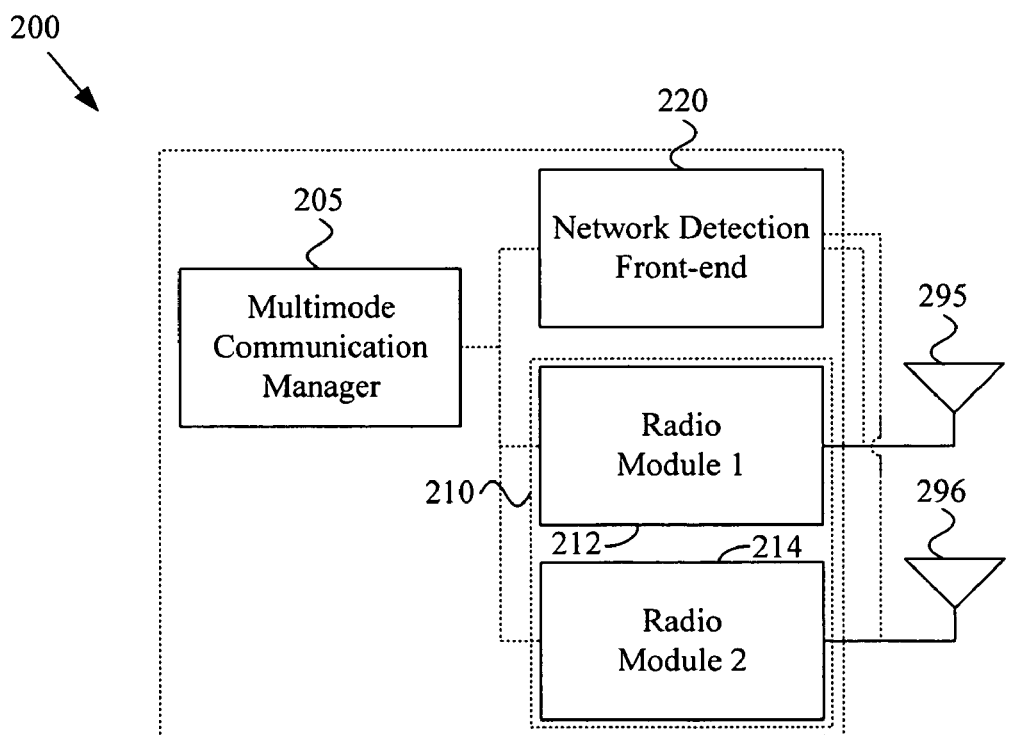
FIG. 2 is a diagram illustrating a portion of an exemplary multimode communication system, in accordance with various aspects of the present invention.

FIG. 2 is a diagram illustrating a portion of an exemplary multimode communication system 200, in accordance with various aspects of the present invention. The exemplary system 200 may comprise at least one radio module 210, which in the exemplary illustration comprises a first radio module 212 and a second radio module 214. For example, the first radio module 212 may correspond to a first communication mode, and the second radio module 214 may correspond to a second communication mode.

The network detection front-end 220 may share various characteristics with the network detection front-end 120 of the exemplary system 100 illustrated in FIG. 1 and discussed previously. For example and without limitation, the network detection front-end 220 may be adapted to determine whether a first communication network corresponding to a first communication mode might be available by analyzing at least one non-informational signal characteristic. The network detection front-end 220 may then, for example, be adapted to determine, based at least in part on the determined availability of the first communication network, whether to operate the first radio module 212 in a mode other than a particular power-save mode.

The network detection front-end 220 may also be adapted to determine whether a second communication network corresponding to a second communication mode might be available by analyzing at least one non-informational signal characteristic. The network detection front-end 220 may then, for example, be adapted to determine, based at least in part on the determined availability of the second communication network, whether to operate the second radio module 214 in a mode other than a particular power-save mode.

The second radio module 214 may be adapted to receive and process the same type of communication signal(s) that the first radio module 212 is adapted to receive and process. As with the first radio module 212, the second radio module 214 may be adapted to receive any of a variety of signals associated with various communication media. Also, the second radio module 214 may be adapted to receive a communication signal associated with any of a variety of communication protocols.

The second radio module 214 may be adapted to consume a second amount of power while processing the received communication signal. The second amount of power may, for example, be less (e.g., significantly less from a power consumption perspective) than the first amount of power consumed by the first radio module 212 while processing the same signal or a similar signal. In a non-limiting exemplary scenario, the second amount of power may be at least 10% less than the first amount of power. In another non-limiting exemplary scenario, the second amount of power may be at least 20% or 30% less than the first amount of power. In yet another non-limiting exemplary scenario, the second amount of power may be at least 50% or 80% less than the first amount of power.

Figure 3:
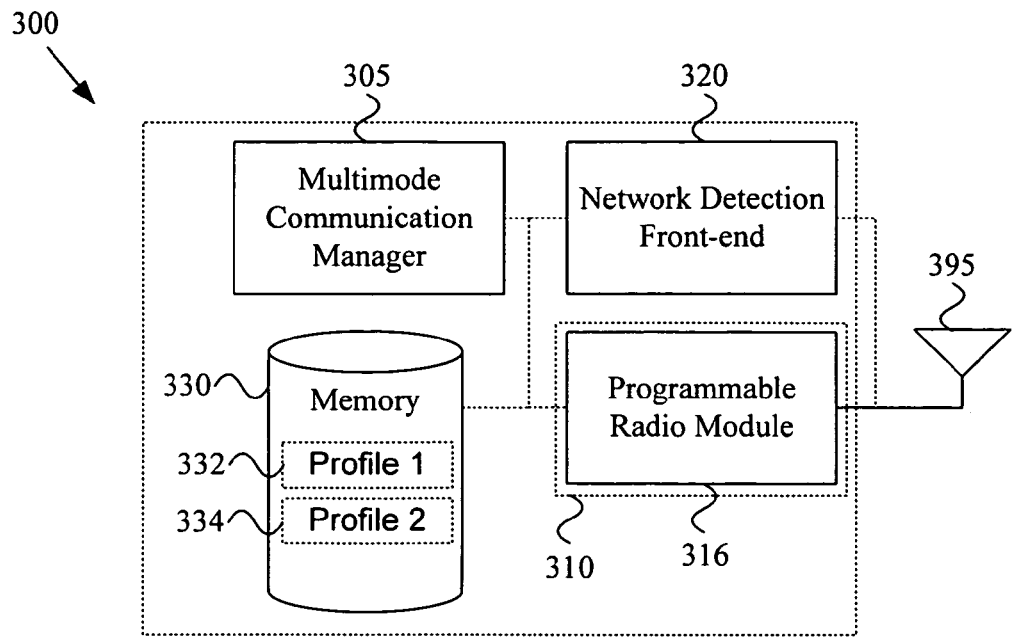
FIG. 3 is a diagram illustrating a portion of an exemplary multimode communication system, in accordance with various aspects of the present invention.

FIG. 3 is a diagram illustrating a portion of an exemplary multimode communication system 300, in accordance with various aspects of the present invention. The exemplary system 300 may comprise at least one radio module 310, which in the exemplary illustration comprises a programmable radio module 316.

The programmable radio module 316 may, for example, be adapted to be capable of communicating in a first communication mode in accordance with a first operating profile 332, information of which may be stored in a memory 330. The programmable radio module 316 may also, for example, be adapted to be capable of communicating in a second communication mode in accordance with a second operating profile 334, information of which may be stored in the memory 330.

The network detection front-end 320 may share various characteristics with the network detection front-ends 120, 220 of the exemplary systems 100-200 illustrated in FIGS. 1-2 and discussed previously. For example and without limitation, the network detection front-end 320 may be adapted to determine whether a first communication network corresponding to a first communication mode might be available by analyzing at least one non-informational signal characteristic. The network detection front-end 320 may also be adapted to determine whether a second communication network corresponding to a second communication mode might be available by analyzing at least one non-informational signal characteristic.

The network detection front-end 320 may then, for example, be adapted to determine, based at least in part on the determined availability of the first and second communication networks, whether to operate the programmable radio module 316 in a mode other than a particular power-save mode. For example, such a mode may comprise another power-save mode, or operating in such a mode may comprise operating the programmable radio module 316 in the first communication mode in accordance with the first profile 332 or in the second communication mode in accordance with the second profile 334.

Figure 4:
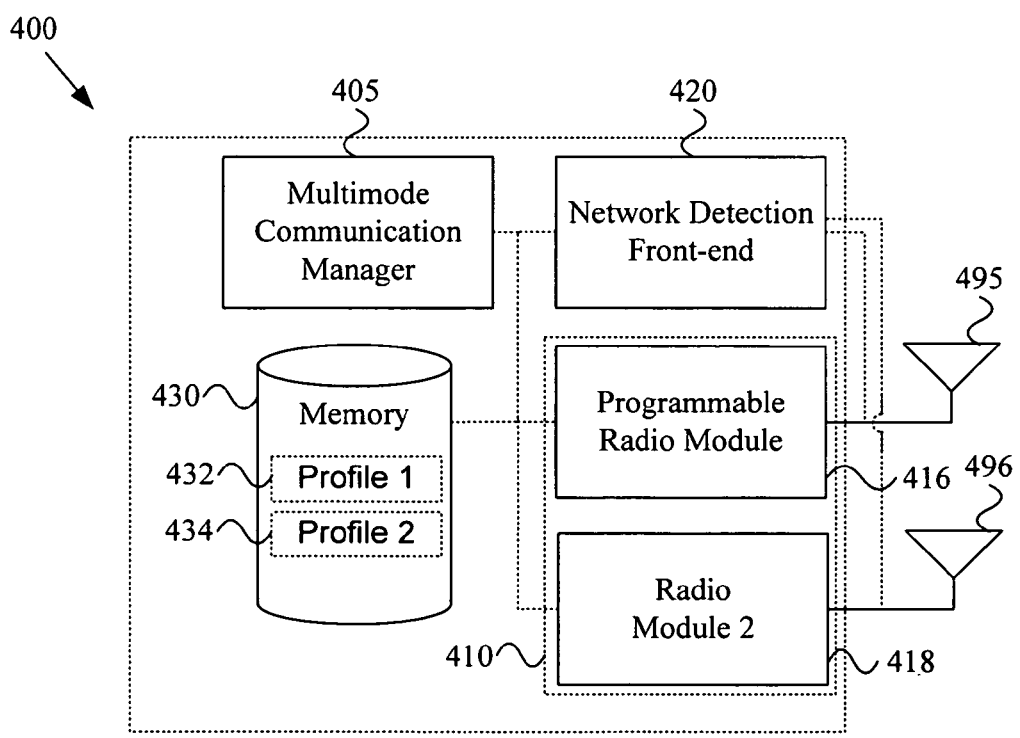
FIG. 4 is a diagram illustrating a portion of an exemplary multimode communication system, in accordance with various aspects of the present invention.

FIG. 4 is a diagram illustrating a portion of an exemplary multimode communication system 400, in accordance with various aspects of the present invention. The exemplary system 400 may comprise at least one radio module 410, which in the exemplary illustration comprises a programmable radio module 416 and a second radio module 418. The programmable radio module 416 may, for example and without limitation, share various characteristics with the programmable radio module 316 of the exemplary system 300 illustrated in FIG. 3, and the second radio module 418 may, for example and without limitation, share various characteristics with one of the radio modules 212, 214 of the exemplary system 200 illustrated in FIG. 2.

The network detection front-end 420 may share various characteristics with the network detection front-ends 120, 220, 320 of the exemplary systems 100-300 illustrated in FIGS. 1-3 and discussed previously. For example and without limitation, the network detection front-end 420 may be adapted to determine whether a first communication network corresponding to a first communication mode might be available by analyzing at least one non-informational signal characteristic. The network detection front-end 420 may also be adapted to determine whether a second communication network corresponding to a second communication mode might be available by analyzing at least one non-informational signal characteristic. The network detection front-end 420 may additionally be adapted to determine whether a third communication network corresponding to a third communication mode might be available by analyzing at least one non-informational signal characteristic.

The network detection front-end 420 may then, for example, be adapted to determine, based at least in part on the determined availability of the first and second communication networks (and/or third communication network), whether to operate the programmable radio module 416 in a mode other than a particular power-save mode. For example, such a mode may comprise another power-save mode, or operating in such a mode may comprise operating the programmable radio module 416 in the first communication mode in accordance with the first profile 432 or in the second communication mode in accordance with the second profile 434. The network detection front-end 420 may also, for example, be adapted to determine, based at least in part on the determined availability of the third communication network (and/or the first and second communication networks), whether to operate the second radio module 418 in a mode other than a particular power-save mode (e.g., in a different power-save mode or in the third communication mode).

Figure 5:
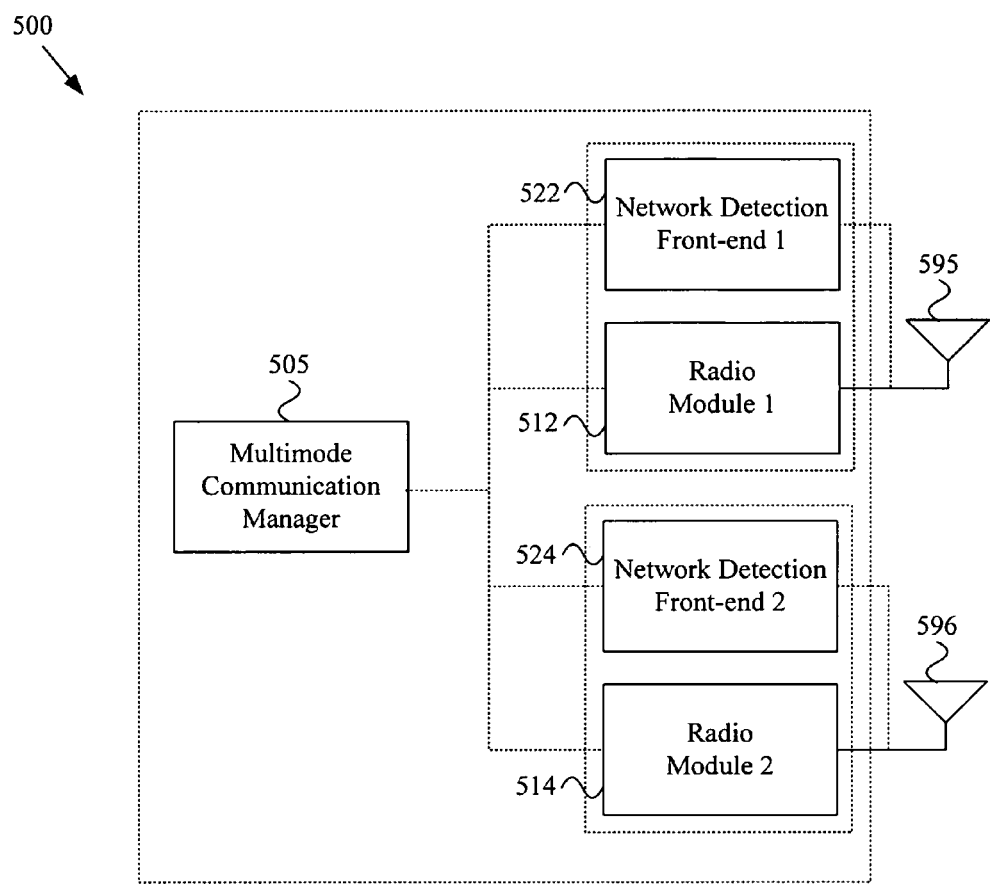
FIG. 5 is a diagram illustrating a portion of an exemplary multimode communication system, in accordance with various aspects of the present invention.

FIG. 5 is a diagram illustrating a portion of an exemplary multimode communication system 500, in accordance with various aspects of the present invention. The exemplary system 500 may comprise a first radio module 512 adapted to communicate in at least a first communication mode and a second radio module 514 adapted to communicate in at least a second communication mode.

The exemplary system 500 may also comprise a first network detection front-end 522 that is dedicated to the first radio module 512 and a second network detection front-end 524 that is dedicated to the second radio module 514. The first and second network detection front-ends 522, 524 may, for example and without limitation, share various characteristics with the exemplary network detection front-ends 120, 220, 320, 420 of the exemplary systems 100-400 illustrated in FIGS. 1-4 and discussed previously.

For example, the first network detection front-end 522 may be adapted to determine whether a first communication network corresponding to a first communication mode might be available by analyzing at least one non-informational signal characteristic. The first network detection front-end 522 may then, for example, be adapted to determine, based at least in part on the determined availability of the first communication network, whether to operate the first radio module 512 in a mode other than a particular power-save mode (e.g., a different power-save mode or the first communication mode).

The second network detection front-end 524 may, for example, also be adapted to determine whether a second communication network corresponding to a second communication mode might be available by analyzing at least one non-informational signal characteristic. The second network detection front-end 524 may then, for example, be adapted to determine, based at least in part on the determined availability of the second communication network, whether to operate the second radio module 514 in a mode other than a particular power-save mode (e.g., a different power-save mode or the second communication mode).

Note that the first and second network detection front-ends 522, 524 may communicate with each other in determining whether to operate their respective radio modules 512, 514 in a mode different than their particular power-save modes. For example and without limitation, such communication may comprise communicating information regarding transmission coordination or other interference-reduction information.

Figure 6:
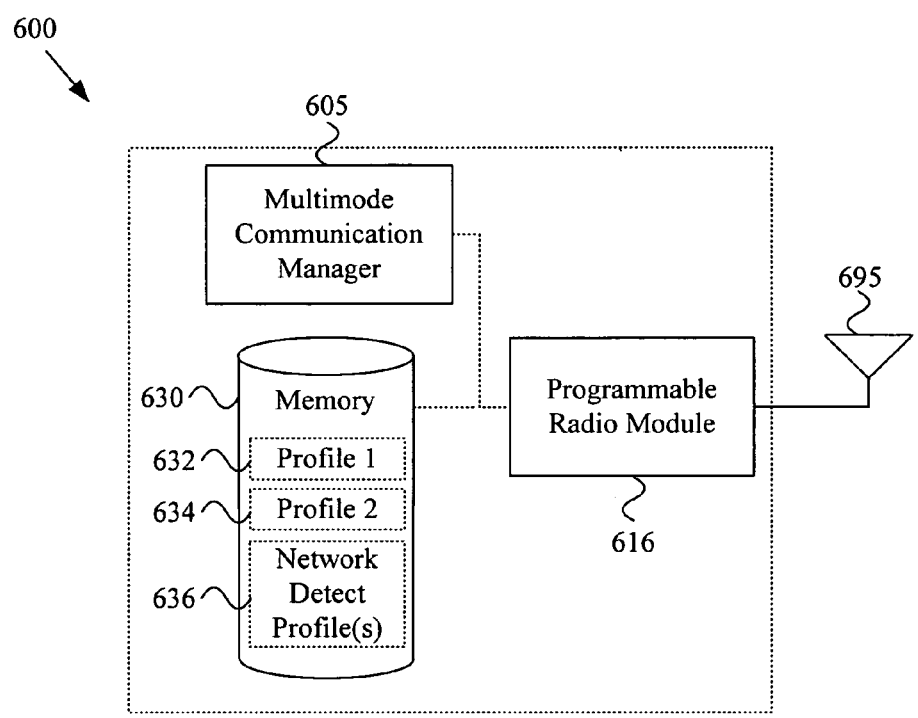
FIG. 6 is a diagram illustrating a portion of an exemplary multimode communication system, in accordance with various aspects of the present invention.

FIG. 6 is a diagram illustrating a portion of an exemplary multimode communication system 600, in accordance with various aspects of the present invention. The exemplary system 600 may comprise at least one programmable radio module 616. The programmable radio module 616 may, for example, be adapted to be capable of communicating in a first communication mode in accordance with a first operating profile 632, information of which may be stored in a memory 630. The programmable radio module 616 may also, for example, be adapted to be capable of communicating in a second communication mode in accordance with a second operating profile 634, information of which may be stored in the memory 630. The programmable radio module 616 may further, for example, be adapted to be capable of operating in a network detection mode in accordance with a network detection profile 636, information of which may be stored in the memory 630.

The programmable radio module 616 (e.g., when operating in accordance with the network detection profile 636) may, for example and without limitation, share various characteristics with the network detection front-ends 120, 220, 320, 420, 520 of the exemplary systems 100-500 illustrated in FIGS. 1-5 and discussed previously. The programmable radio module 616 may also, for example and without limitation, share various characteristics with the programmable radio modules, 316, 416 of the exemplary systems 300, 400 illustrated in FIGS. 3-4 and discussed previously.

For example, the programmable radio module 616, operating in accordance with the network detection profile 636, may be adapted to determine whether a first communication network corresponding to a first communication mode might be available by analyzing at least one non-informational signal characteristic. Also for example, the programmable radio module 616, operating in accordance with the network detection profile 636, may be adapted to determine whether a second communication network corresponding to a second communication mode might be available by analyzing at least one non-informational signal characteristic.

The programmable radio module 616, operating in accordance with the network detection profile 636, may then, for example, be adapted to determine, based at least in part on the determined availability of the first and second communication networks, whether to operate the programmable radio module 616 in a mode other than a particular power-save mode. For example, such a mode may comprise another power-save mode, or operating in such a mode may comprise operating the programmable radio module 616 in the first communication mode in accordance with the first profile 632 and/or in the second communication mode in accordance with the second profile 634.

The exemplary systems 100-600 illustrated in FIGS. 1-6 were presented to provide non-limiting illustrative examples of various broader aspects of the present invention. Accordingly, the scope of various aspects of the present invention should not be limited by particular characteristics of the exemplary systems 100-600.

For illustrative clarity, the exemplary systems 100-600 were presented in terms of various functional modules. Various modules may, for example, be implemented in hardware, software or a combination thereof. Also, various modules may share various sub-modules and/or subcomponents. For example and without limitation, various hardware modules may share various electrical components, and various software modules may share various software subroutines. Accordingly, the scope of various aspects of the present invention should not be limited by characteristics of any particular hardware and/or software implementation or by any arbitrary boundaries between various functional modules.

The previous discussion of FIGS. 2-6 generally concerned exemplary scenarios with dual radios or radio modules and a single type of communication signal. Such exemplary scenarios were presented for illustrative clarity and should not limit the scope of various aspects of the present invention to single-mode mobile communication devices. For example, various aspects of the present invention are readily extensible to multi-mode radio systems (e.g., radios receiving communication signals communicated in accordance with more than one communication protocol). For example and without limitation, a first receiver or receiver module may receive a communication signal, analyze the communication signal to determine whether to wake a second receiver associated with a first communication protocol or a third receiver associated with a second communication protocol. Also for example, a first receiver or receiver module and a second receiver or receiver module may both receive a communication signal and may each determine whether to wake respective associated sleeping receivers.

Figure 7:
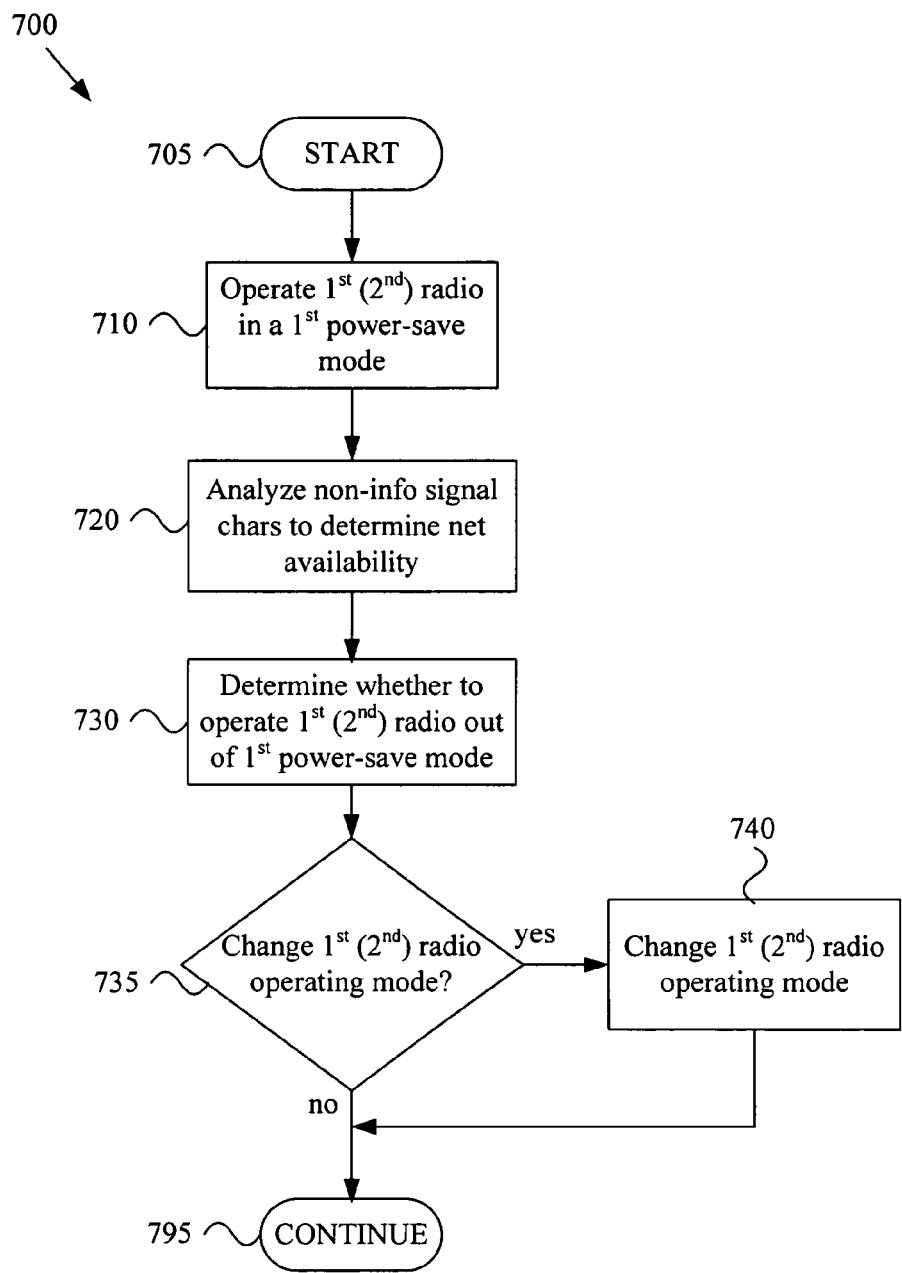
FIG. 7 is a diagram illustrating a method for operating a multimode communication system in an energy-efficient manner, in accordance with various aspects of the present invention.

FIG. 7 is a diagram illustrating a method 700 for operating a multimode communication system in an energy-efficient manner, in accordance with various aspects of the present invention. The exemplary method 700 may, for example and without limitation, share various functional characteristics with the exemplary systems 100-600 illustrated in FIGS. 1-6 and discussed previously.

The exemplary method 700 (and other methods discussed herein) may be implemented in any of a variety of multimode communication systems or devices. For example and without limitation, the exemplary method 700 may be implemented in a mobile communication device (e.g., a cellular telephone, pager, portable email device, etc.) having multimode communication capability. Also for example, the exemplary method 700 (and other exemplary systems discussed herein) may be implemented in any of a variety of computing devices (e.g., laptop computers, notebook computers, handheld computers, etc.) that have been adapted to have multimode communication capability. In general, the exemplary method 700 (and other methods discussed herein) may be utilized in any of a variety of electronic systems or devices that have multimode communication capability. Accordingly, the scope of various aspects of the present invention should not be limited by characteristics of any particular type of electronic device having multimode communication capability.

The exemplary method 700 may begin executing at step 705. The exemplary method 700 (and other methods discussed herein) may begin executing for any of a variety of reasons. For example and without limitation, the exemplary method 700 may begin executing upon power-up or reset of a multimode communication system or device that is implementing the exemplary method 700. Further for example, the exemplary method 700 may begin executing in response to one or more radios or radio modules of such a communication device entering a power-save mode. Additionally for example, the exemplary method 700 may begin executing in response to a user command or command received from another communication system. Accordingly, the scope of various aspects of the present invention should not be limited by characteristics of any particular initiating cause or condition.

The exemplary method 700 may, at step 710, comprise operating at least a first radio module in a first power-save mode. A power-save mode may comprise any of a variety of power-save mode characteristics, some of which were mentioned previously. For example and without limitation, a power-save mode may comprise characteristics of shutting down particular electrical components or significantly reducing a clock rate input to various electrical devices. Also for example, a power-save mode may comprise characteristics of bypassing particular components or periodically waking to determine whether a full wake up should proceed. The scope of various aspects of the present invention should not be limited by characteristics of any particular type of sleep mode.

In a non-limiting exemplary scenario, step 710 may comprise operating a first radio module in a respective first power-save mode and a second radio module in a respective first power-save mode. In another non-limiting exemplary, step 710 may comprise operating one or more programmable radio modules in respective first power-save modes.

The exemplary method 700 may, at step 720, comprise analyzing at least one non-informational signal characteristic to determine whether a first communication network corresponding to a first communication mode of a plurality of communication modes might be available. Step 720 may, for example and without limitation, share various functional characteristics with the network detection front-ends 120, 220, 320, 420, 520 and 620 of the exemplary systems 100-600 illustrated in FIGS. 1-6 and discussed previously.

Step 720 may be implemented utilizing any of a variety of types of hardware and/or software. For example, step 720 may be implemented in hardware and/or software that is dedicated to the performance of step 720. Also for example, step 720 (or portions thereof) may be implemented utilizing various hardware and/or software that is generally utilized for radio communication (e.g., a tuner, amplifier, filter, antenna etc.). Accordingly, the scope of various aspects of the present invention should not be limited by characteristics of any particular hardware and/or software implementation.

Step 720 may comprise analyzing the non-informational signal characteristics in any of a variety of manners. For example and without limitation, step 720 may comprise determining whether a first (or other) communication network corresponding to the first (or other) communication mode might be available by, at least in part, analyzing signal presence at a particular frequency or in a particular frequency range. For example and without limitation, the first communication mode might generally include the presence of one or more signal at a particular frequency or in a particular frequency range.

Also for example, step 720 may comprise determining whether a first (or other) communication network corresponding to the first (or other) communication mode might be available by, at least in part, analyzing strength of a received signal. For example and without limitation, step 720 may utilize any of a variety of Received Signal Strength Indication ("RSSI") circuitry to determine such signal strength. For example, step 720 may comprise determining that a signal presence above a particular signal strength or S/N ratio threshold is necessary for effective communication. In such an exemplary scenario, step 720 may comprise determining that a signal presence or S/N ratio below the threshold effectively indicates that the corresponding communication network is not available.

Further for example, step 720 may comprise determining whether a first (or other) communication network corresponding to the first (or other) communication mode might be available by, at least in part, analyzing spectral content of a received signal. For example and without limitation, a received signal corresponding to a particular communication mode may generally comprise particular spectral characteristics. In such an exemplary scenario, step 720 may comprise determining that the presence of one or more particular spectral characteristics indicates that a network compatible with a particular communication mode (e.g., the first communication mode) might be available.

Still further for example, step 720 may comprise determining whether a first (or other) communication network corresponding to the first (or other) communication mode might be available by, at least in part, analyzing temporal characteristics of a received signal. For example and without limitation, a received signal corresponding to a particular communication mode might comprise particular temporal characteristics. In such an exemplary scenario, step 720 may comprise determining that the presence of one or more particular temporal characteristics indicates that a network compatible with a particular communication mode might be available.

Also for example, step 720 may comprise determining whether a first (or other) communication network corresponding to the first (or other) communication mode might be available by, at least in part, analyzing modulation characteristics of a received signal. For example and without limitation, a received signal corresponding to a particular communication mode may generally comprise particular modulation characteristics. In such an exemplary scenario, step 720 may comprise determining that the presence of one or more particular modulation characteristics indicates that a network compatible with a particular communication mode might be available.

U.S. patent application Ser. No. 11/298,881, filed Dec. 7, 2005, titled "Mobile Communication Device with Low Power Signal Detector," is hereby incorporated herein in its entirety by reference. Such reference presents various non-limiting examples of analyzing non-informational signal characteristics to determine whether a communication network might be available.

Additionally for example, step 720 may comprise determining whether a first (or other) communication network corresponding to the first (or other) communication mode might be available by, at least in part, analyzing one or more sub-signals of a received signal. For example and without limitation, a received signal corresponding to a particular communication mode might comprise particular sub-signal characteristics. In such an exemplary scenario, step 720 may comprise determining that the presence of one or more particular sub-signal characteristics indicates that a network compatible with a particular communication mode might be available.

The previously discussed exemplary scenarios presented non-limiting examples of analyzing various non-informational signal characteristics. The examples are not exhaustive and should by no means limit the scope of various aspects of the present invention to characteristics of the various examples.

Though the previous non-limiting exemplary scenarios discussed the analysis of individual non-informational signal characteristics, it should be understood that step 720 may comprise analyzing any combination of various non-informational signal characteristics. For example and without limitation, step 720 may comprise determining whether a first (or other) communication network corresponding to the first (or other) communication mode might be available by, at least in part, analyzing modulation type of signals received in a particular frequency range. Also for example, step 720 may comprise analyzing spectral content of signals received above a particular signal strength threshold. Accordingly, the scope of various aspects of the present invention should not be limited by characteristics of analyzing any one or any combination of non-informational signal characteristics.

The exemplary method 700 may, at step 730, comprise determining, based at least in part on the determined availability of the first communication network (or other communication network), whether to operate at least one radio module in an operating mode other than a first power-save mode (e.g., a second power-save mode, full-power mode, etc.). Step 730 may, for example and without limitation, share various functional characteristics with the network detection front-ends 120, 220, 320, 420, 520 and 620 of the exemplary systems 100-600 illustrated in FIGS. 1-6 and discussed previously. Step 730 may comprise performing such determining in any of a variety of manners.

For example and without limitation, step 730 may comprise determining to operate a radio module in an operating mode other than a particular power-save mode whenever it is determined that one or more particular communication networks might be available. Also for example, step 730 may comprise determining to operate at least one radio module in a second low-power mode where, for example, the at least one radio module wakes periodically to listen for messages communicated in a particular communication mode.

In an additional example, step 730 may comprise determining to operate at least one radio module in a fully functional mode to determine whether a detected communication network corresponds to a particular communication mode. Also for example, step 730 may comprise determining to operate at least one radio module in a partially functional mode, for example, including performing relatively low-power signal decoding (e.g., to determine additional information about a detected communication network).

In a further example, step 730 may comprise determining to operate at least one radio module in an operating mode other than a particular power-save mode based, at least in part, on communication quality expected in communicating with various communication networks that might be available. For example, step 730 may comprise determining to fully activate a radio module corresponding to a highest expected communication quality. Similarly, step 730 may comprise making such determination based, at least in part, on communication monetary cost, power demands, predetermined priority, a user preference profile, etc.

In a further example, step 730 may comprise determining to operate at least one radio module in a manner that sequentially alternates between communicating with various detected communication networks. In a still further example, step 730 may comprise determining to operate at least one radio module to primarily service the highest priority communication network of a plurality of detected communication networks.

In general, step 730 may comprise determining, based at least in part on the determined availability of the first (or other) communication network, whether to operate at least one radio module in a respective mode other than a particular power-save mode. Accordingly, the scope of various aspects of the present invention should not be limited by characteristics of any particular manner of making such determination.

The exemplary method 700 may, at step 735, comprise controlling execution flow of the exemplary method 700. For example, if it is determined at step 730 to operate a first (or other) radio module in an operating mode other than a particular power-save mode, step 735 may comprise directing execution flow of the exemplary method 700 to step 740, which will be discussed below. If, on the other hand, it is not determined at step 730 to operate a first (or other) radio module in an operating mode other than a particular power-save mode, then step 735 may comprise directing execution flow of the exemplary method 700 to step 795 for continued processing.

The exemplary method 700 may, at step 740, comprise changing the operating mode of the first (or other) radio module to a different operating mode. Such a different operating mode may, for example, comprise a different power-save mode than a particular power-save mode or a fully functional mode (e.g., a first communication mode or a second communication mode). Step 740 may comprise changing a radio (or radio module) operating mode in any of a variety of manners.

For example and without limitation, step 740 may comprise fully activating a radio module that was previously operating in a power-save mode. In various exemplary scenarios, such activation may comprise generating enabling signals, providing a clock or modified clock signal, providing different power supply signals, etc. In another exemplary scenario, step 740 may comprise loading an operating profile, according to which a radio module (e.g., a programmable radio module) is to operate.

In another exemplary scenario, step 740 may comprise operating a radio module in a different power-save mode. For example and without limitation, the different power-save mode may be characterized by a reduced set of communication functionality relative to a full set of communication functionality and an increased set of communication functionality relative to another power-save mode. For example and without limitation, the reduced set of communication functionality may comprise partial decoding capability, no or reduced error detection/correction capability, reduced sample clock rate, reduced signal amplification, simpler filtering, etc.

In general, step 740 may comprise operating a radio (or radio module) in an operating mode that is different than a particular power-save mode. Accordingly, the scope of various aspects of the present invention should not be limited by any particular radio operating mode or manner of changing a radio operating mode.

The exemplary method 700 may, at step 795, comprise performing continued processing. For example, as will be discussed in more detail with regard to FIG. 8, step 795 may comprise analyzing various informational signal characteristics. Such analysis may, for example, supplement the previously discussed non-informational analysis. In various exemplary scenarios, such analysis may also, for example, replace the previously discussed non-informational analysis. Such information analysis may comprise analyzing decoded information from a signal (e.g., decoded information resulting from partial or full signal decoding). Also, such information analysis may comprise analyzing non-decoded informational characteristics of a signal (e.g., detecting signal patterns or trends).

Step 795 may also, for example, comprise returning execution flow of the exemplary method 700 back up to step 710, for further power-save operation, or back up to step 720, for continued signal analysis (e.g., repeating steps 720-740 with regard to additional communication networks or modes). In general, step 795 may comprise performing continued processing. Accordingly, the scope of various aspects of the present invention should not be limited by characteristics of any particular type of continued processing.

Figure 8:
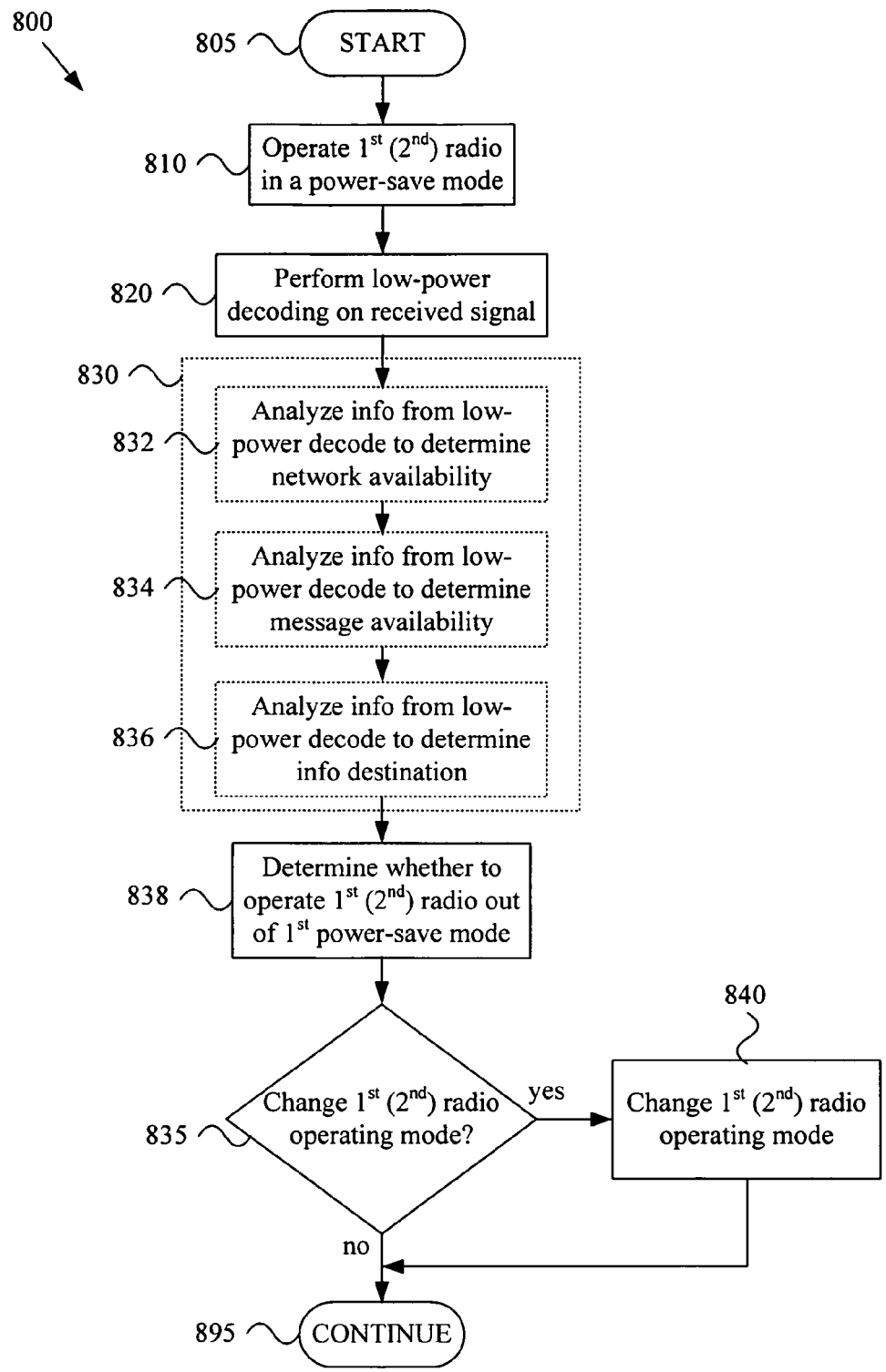
FIG. 8 is a diagram illustrating a method for operating a multimode communication system in an energy-efficient manner, in accordance with various aspects of the present invention.

FIG. 8 is a diagram illustrating a method 800 for operating a multimode communication system in an energy-efficient manner, in accordance with various aspects of the present invention. The exemplary method 800 may, for example and without limitation, share various characteristics with the exemplary method 700 illustrated in FIG. 7 and discussed previously. Additionally, for example and without limitation, the exemplary method 800 may, for example and without limitation, share various functional characteristics with the exemplary systems 100-600 illustrated in FIGS. 1-6 and discussed previously.

The exemplary method 800 may begin executing at step 805. The exemplary method 800 may begin executing for any of a variety of manners, examples of which were discussed previously with regard to step 705 of the exemplary method 700. For example and without limitation, step 805 may flow from step 795 of the exemplary method 700 illustrated in FIG. 7. Also, in various exemplary scenarios, the exemplary method 800 may be performed in lieu of the exemplary method 700 illustrated in FIG. 7, depending on the particular operating scenario. The scope of various aspects of the present invention should not be limited by characteristics of any particular initiating cause or condition.

The exemplary method 800 may, at step 810, comprise operating at least a first radio module in a first power-save mode. Step 810 may, for example and without limitation, share various characteristics with step 710 of the exemplary method 700 illustrated in FIG. 1 and discussed previously.

The exemplary method 800 may, at step 820, comprise performing a relatively low power decode on a received signal. For example and without limitation, step 820 may share any or all functional characteristics with the network detection front-ends 120, 220, 320, 430, 520 and 620 of the exemplary systems 100-600 illustrated in FIGS. 1-6 and discussed previously.

For example and without limitation, step 820 may comprise at least partially decoding the signal to determine network identity, whether the first communication network is available, has messages waiting for a particular communication device, is presently attempting to communicate with a particular communication device, etc. Step 820 may comprise performing such partial decoding in any of a variety of manners.

For example, step 820 may comprise decoding a signal utilizing relatively reduced decoding functionality (e.g., utilizing only a portion of decoding circuitry or using particular decoding circuitry at a reduced performance level to perform the decoding operation). For example, step 820 may be adapted to utilize various components of at least one radio module to perform such decoding operation.

In a non-limiting exemplary scenario, step 820 may comprise performing such partial decoding without utilizing error detection/correction circuitry that might generally be used for full decoding. In another non-limiting exemplary scenario, step 820 may comprise performing such partial decoding without running various frequency synthesis circuitry (e.g., phase lock loop circuitry) or running such circuitry at a reduced level of performance.

In another non-limiting exemplary scenario, step 820 may comprise performing such partial decoding by searching for modulated signal sample values or sequences of signal sample values. For example and without limitation, step 820 may comprise sampling a received signal and comparing a sequence of samples to a particular expected (or reference) sequence of samples. Also for example, step 820 may comprise sampling a received signal and processing such samples (e.g., statistically) to determine whether a first communication network corresponding to the first communication mode might be available. For example, various signals corresponding to various communication networks, various information sources, various information destinations or various information types may be characterized by particular statistical traits.

For example and without limitation, U.S. patent application Ser. No. 11/299,230, filed Dec. 7, 2005, titled "Mobile Communication Device with Low Power Receiver for Signal Detection," which is hereby incorporated herein in its entirety by reference, presents various non-limiting examples of analyzing various informational signal characteristics. Such reference provides various non-limiting examples utilizing a relatively low-power receiver to receive and/or analyze various informational signal characteristics. For example, relative to a first normal receiver, a first relatively low-power receiver may utilize any of a different frequency synthesizer, A/D converter, filter, signal processing type or amount, processor speed, voltage and/or current levels, etc.

In general, step 820 may comprise performing low-power decoding (e.g., low power relative to power utilized for full decoding) on a received signal. Accordingly, the scope of various aspects of the present invention should not be limited by characteristics of any particular manner of decoding utilizing relatively low power.

The exemplary method 800 may, at step 830, comprise analyzing informational characteristics of a received signal (e.g., to determine whether one or more particular communication networks might be available). Step 830 may, for example, comprise analyzing information decoded from a received signal at step 820. Step 830 may comprise analyzing such informational characteristics in any of a variety of manners.

For example, step 830 (e.g., at sub-step 832) may comprise analyzing informational characteristics of a received signal to determine whether a particular communication network is available. In an exemplary scenario where it was determined (e.g., based on analysis of various non-informational or informational signal characteristics) that a first communication network corresponding to a first communication mode might be available, sub-step 832 may comprise at least partially analyzing informational characteristics of a signal to determine network identity associated with a particular received signal.

Also for example, step 830 (e.g., at sub-step 834) may comprise analyzing informational characteristics of a received signal to determine whether a particular communication network has messages awaiting delivery to the system implementing the method 800. In an exemplary scenario where it was determined (e.g., based on analysis of various non-informational or informational signal characteristics) that a first communication network corresponding to a first communication mode might be available, sub-step 834 may comprise analyzing information characteristics of a received signal to determine whether the first communication network has messages waiting for delivery to a particular communication device currently implementing the exemplary method 800.

Additionally for example, step 830 (e.g., at sub-step 836) may comprise analyzing informational characteristics of a received signal to determine whether a particular signal is presently communicating information that is intended to be received by a communication system implementing the exemplary method 800. In an exemplary scenario where it was determined (e.g., based on analysis of various non-informational or informational signal characteristics) that a first communication network corresponding to a first communication mode might be available, sub-step 836 may comprise analyzing informational characteristics of a received signal to determine whether a received signal is addressed to (or otherwise intended to be received by) a communication device implementing the exemplary method 800.

In general, in various non-limiting exemplary scenarios, various informational signal characteristics may be analyzed to determine whether a first (or other) communication network corresponding to a first (or other) communication mode of the plurality of communication modes might be available. Accordingly, the scope of various aspects of the present invention should not be limited by characteristics of any particular manner of analyzing such informational signal characteristics.

The exemplary method 800 may, at step 838, comprise determining, based at least in part on the determined availability of the first communication network (or other communication network), whether to operate at least one radio module in an operating mode other than a first power-save mode (e.g., a second power-save mode, full-power mode, etc.). Step 838 may, for example and without limitation, share various characteristics with step 730 of the exemplary method 700. Step 838 may also, for example and without limitation, share various functional characteristics with the network detection front-ends 120, 220, 320, 420, 520 and 620 of the exemplary systems 100-600 illustrated in FIGS. 1-6 and discussed previously.

The exemplary method 800 may, at step 835, comprise controlling execution flow of the exemplary method 800. The exemplary method 800 may, at step 840, comprise changing the operating mode of a radio module to a different operating mode. The exemplary method 800 may, at step 895, comprise performing continued processing. Steps 835, 840 and 895 may, for example and without limitation, share various characteristics with steps 735, 740 and 795 of the exemplary method 700 illustrated in FIG. 7 and discussed previously.

Exemplary methods 700 and 800 were presented to provide specific non-limiting examples of various broader aspects of the present invention. Accordingly, the scope of various aspects of the present invention should not be limited by characteristics of the exemplary methods 700, 800.

For illustrative clarity, the exemplary systems 100-600 were presented in terms of various functional modules. Various modules may, for example, be implemented in hardware, software or a combination thereof. Also, various modules may share various sub-modules and/or subcomponents. For example and without limitation, various hardware modules may share various electrical components, and various software modules may share various software subroutines. Accordingly, the scope of various aspects of the present invention should not be limited by characteristics of any particular hardware and/or software implementation or by any arbitrary boundaries between various functional modules.

In summary, various aspects of the present invention provide a system and method providing low-power operation in a multimode communication device. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system for providing low-power operation in a multimode communication device, the system comprising:
   at least one radio module operable to communicate in a plurality of communication modes and operable in at least a first power-save mode different from the plurality of communication modes, wherein the at least one radio module comprises:
   a first receiver module operable to consume a first amount of power while processing a communication signal corresponding to a first communication mode; and
   a second receiver module operable to consume a second amount of power while processing a communication signal corresponding to the first communication mode, where the second amount of power is less than the first amount of power and the second receiver module consumes less power relative to the first receiver module when processing similar signals corresponding to the first communication mode; and
   at least one module operable to:
   determine whether a first communication network corresponding to the first communication mode of the plurality of communication modes might be available by analyzing at least one informational signal characteristic of a signal received by the second receiver module; and
   determine, based at least in part on the determined availability of the first communication network, whether to operate the at least one radio module in an operating mode other than the first power-save mode.

2. The system of claim 1, wherein the at least one radio module further comprises:
   a third receiver module operable to consume a third amount of power while processing a communication signal corresponding to a second communication mode; and
   a fourth receiver module operable to consume a fourth amount of power while processing a communication signal corresponding to the second communication mode, where the fourth amount of power is less than the third amount of power and the fourth receiver module consumes less power relative to the third receiver module when processing similar signals corresponding to the second communication mode; and
   the at least one module further operable to:
   determine whether a second communication network corresponding to the second communication mode of the plurality of communication modes might be available by analyzing at least one informational signal characteristic of a signal received by the fourth receiver module; and
   determine, based at least in part on the determined availability of the second communication network, whether to operate the at least one radio module in a respective mode other than the first power-save mode.

3. The system of claim 1, wherein the second receiver module is operable at a lower performance level relative to the first receiver module when processing similar signals corresponding to the first communication mode.

4. The system of claim 1, wherein the second receiver module is operable to perform less processing relative to the first receiver module when processing similar signals corresponding to the first communication mode.

5. The system of claim 1, wherein the second receiver module is adapted to perform A/D conversion at a lower level of resolution relative to the first receiver module when processing similar signals corresponding to the first communication mode.

6. The system of claim 1, wherein the second receiver module is operable to perform filtering at a reduced quality level relative to the first receiver module when processing similar signals corresponding to the first communication mode.

7. The system of claim 1, wherein the first power-save mode is a power-save mode of a first radio module of the at least one radio module, and the operating mode other than the first power-save mode is a second power-save mode of the first radio module different from the first-power-save mode.

8. In a multimode communication device operable to communicate in a plurality of communication modes, a method for providing low-power operation, the method comprising:
operating at least one radio module, which is operable to communicate in a plurality of communication modes and operable in at least a first power-save mode different from the plurality of communication modes, wherein the at least one radio module comprises:
a first receiver module operable to consume a first amount of power while processing a communication signal corresponding to a first communication mode; and
a second receiver module operable to consume a second amount of power while processing a communication signal corresponding to the first communication mode, where the second amount of power is less than the first amount of power and the second receiver module consumes less power relative to the first receiver module when processing similar signals corresponding to the first communication mode; and
determining whether a first communication network corresponding to the first communication mode of the plurality of communication modes might be available by analyzing at least one informational signal characteristic of a signal received by the second receiver module; and
determining, based at least in part on the determined availability of the first communication network, whether to operate the at least one radio module in an operating mode other than the first power-save mode.

9. The method of claim 8, wherein the at least one radio module further comprises:
a third receiver module operable to consume a third amount of power while processing a communication signal corresponding to a second communication mode; and
a fourth receiver module operable to consume a fourth amount of power while processing a communication signal corresponding to the second communication mode, where the fourth amount of power is less than the third amount of power and the fourth receiver module consumes less power relative to the third receiver module when processing similar signals corresponding to the second communication mode;
wherein the method further comprises:
determining whether a second communication network corresponding to the second communication mode of the plurality of communication modes might be available by analyzing at least one informational signal characteristic of a signal received by the fourth receiver module; and
determining, based at least in part on the determined availability of the second communication network, whether to operate the at least one radio module in a respective mode other than the first power-save mode.

10. The method of claim 8, wherein the second receiver module operates at a lower performance level relative to the first receiver module when processing similar signals corresponding to the first communication mode.

11. The method of claim 8, wherein the second receiver module performs less processing relative to the first receiver module when processing similar signals corresponding to the first communication mode.

12. The method of claim 8, wherein the second receiver module performs A/D conversion at a lower level of resolution relative to the first receiver module when processing similar signals corresponding to the first communication mode.

13. The method of claim 8, wherein the second receiver module performs filtering at a reduced quality level relative to the first receiver module when processing similar signals corresponding to the first communication mode.

14. The method of claim 8, wherein the first power-save mode is a power-save mode of a first radio module of the at least one radio module, and the operating mode other than the first power-save mode is a second power-save mode of the first radio module different from the first power-save mode.

* * * * *